(12) United States Patent
Johannsen

(10) Patent No.: US 12,221,772 B2
(45) Date of Patent: Feb. 11, 2025

(54) COMPONENT WEAR MONITORING BASED ON STRAIN DATA

(71) Applicant: Caterpillar Inc., Peoria, IL (US)

(72) Inventor: Eric J. Johannsen, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 380 days.

(21) Appl. No.: 17/644,583

(22) Filed: Dec. 16, 2021

(65) Prior Publication Data

US 2023/0193597 A1  Jun. 22, 2023

(51) Int. Cl.
*E02F 9/26* (2006.01)
*B62D 55/20* (2006.01)
*G01L 1/22* (2006.01)

(52) U.S. Cl.
CPC ............ *E02F 9/26* (2013.01); *G01L 1/22* (2013.01); *B62D 55/20* (2013.01)

(58) Field of Classification Search
CPC ... E02F 9/26; G01L 1/22; B62D 55/20; B62D 55/21; B62D 55/32; G05B 23/02
See application file for complete search history.

(56) References Cited

U.S. PATENT DOCUMENTS

| | | |
|---|---|---|
| 9,475,526 B2 | 10/2016 | McKinley et al. |
| 9,975,554 B2 | 5/2018 | Lussier et al. |
| 10,933,877 B2 | 3/2021 | Lussier et al. |
| 2013/0082846 A1* | 4/2013 | McKinley ............... G07C 3/08 340/870.01 |
| 2015/0191173 A1* | 7/2015 | Lussier ................ B60W 40/10 701/90 |
| 2015/0337522 A1* | 11/2015 | Diekevers ................ E02F 9/26 701/33.9 |
| 2016/0052572 A1* | 2/2016 | McKinley ............. G01B 21/18 305/15 |
| 2021/0053632 A1 | 2/2021 | Couture et al. |
| 2021/0173399 A1 | 6/2021 | Richard et al. |
| 2021/0209869 A1 | 7/2021 | Kremmer et al. |
| 2022/0139117 A1* | 5/2022 | Zhang ...................... G06N 3/08 701/29.4 |

FOREIGN PATENT DOCUMENTS

| | | |
|---|---|---|
| JP | 5636332 B2 | 12/2014 |
| WO | 2019/097556 A1 | 5/2019 |

* cited by examiner

*Primary Examiner* — Thomas E Worden
*Assistant Examiner* — Christopher Scott

(57) ABSTRACT

A component, of a machine, may comprise a body comprising a cavity; and a sensing assembly located in the cavity. The sensing assembly may comprise a strain measurement device configured to generate strain data indicating an amount of strain experienced by a portion of the component. The sensing assembly may further comprises a component controller configured to generate, based on the strain data, wear information indicating an amount of wear of the portion of the component; and cause the wear information to be provided to one or more devices.

20 Claims, 3 Drawing Sheets

COMPONENT WEAR MONITORING BASED ON STRAIN DATA

TECHNICAL FIELD

The present disclosure relates generally to monitoring components of a machine and, for example, to monitoring the components based on strain data.

BACKGROUND

Components, of an undercarriage of a machine, may wear over a period of time. One technique for determining wear of the components includes determining the wear based on information identifying an expected useful life of the components. The information may not be uniformly applicable to the components due to various applications (or usages) of the components and/or various conditions under which the components are used.

As a result of the various applications and/or the various conditions, the expected useful life may result in incorrect predictions regarding an amount of wear of the components. As a result of such incorrect predictions, the components may either fail prematurely or may be repaired or replaced prematurely (e.g., because the components may not be sufficiently worn to require replacement or repair). Such premature failure of the components or premature replacement or repair of the components may also negatively affect productivity at the work site.

Another technique for detecting wear of components includes obtaining manual measurements of dimensions of such components. The manual measurements may be compared against specified dimensions of the components. In order to obtain the manual measurements, the machine is required to suspend performing a task at a work site. Because obtaining manual measurements requires the machine to suspend performing the task and is a time-consuming process (e.g., due to the travel time for obtaining manual measurements and/or the amount of time for obtaining the manual measurements), obtaining manual measurements may negatively affect productivity at the work site. In this regard, the task (that is to be performed or that is being performed by the machine) may be suspended for a long period of time (e.g., a period of time during which the manual measurements are obtained).

Additionally, such manual measurements can be inaccurate. Inaccurate measurements of component dimensions, in turn, may also result in incorrect predictions regarding the amount of wear of the components.

U.S. Pat. No. 10,933,877 (the '877 patent) discloses a method for managing a drive mode of a tracked vehicle. The '877 patent discloses the step of reading an output of a sensor and in response to the output of the sensor performing a control action to manage the drive mode of the vehicle.

While the '877 patent discloses performing a control action to manage a drive mode of a vehicle in response to an output of a sensor, the '877 patent does not address determining an amount of wear of components of the tracked vehicle. Rather, the '877 patent is directed to managing the drive mode of the tracked vehicle.

The system of the present disclosure solves one or more of the problems set forth above and/or other problems in the art.

SUMMARY

A component, of a machine, may comprise a body comprising a cavity; a strain measurement device located in the cavity and configured to generate strain data indicating an amount of strain experienced by a portion of the component; a wireless communication device; and a component controller. The component controller may be configured to determine an amount of wear, of the portion of the component, based on the strain data; generate wear information indicating the amount of wear; and cause the wireless communication device to transmit the wear information.

A system may comprise a device associated with a machine; and a sensing assembly located in a cavity of a component of the machine. The sensing assembly may comprise a strain measurement device configured to generate strain data indicating an amount of strain experienced by a portion of the component, and a component controller configured to generate, based on the strain data, wear information indicating an amount of wear of the portion of the component; and cause the wear information to be provided to the device to cause an adjustment of an operation of the machine.

A component, of a machine, may comprise a body comprising a cavity; and a sensing assembly located in the cavity. The sensing assembly may comprise a strain measurement device configured to generate strain data indicating an amount of strain experienced by a portion of the component; and a component controller configured to generate, based on the strain data, wear information indicating an amount of wear of the portion of the component; and cause the wear information to be provided to one or more devices.

DETAILED DESCRIPTION

Implementations described herein are directed to monitoring wear of a component of a machine based on strain data of a strain measurement device. For example, a sensing assembly may be provided in a cavity of the component. The sensing assembly may include the strain measurement device, a component controller, and a wireless communication device. The strain measurement device may generate strain data indicating an amount of strain experienced by the component (e.g., experienced by a portion of the component).

The strain measurement device may be provided adjacent to a wear surface of the component. In this regard, as an amount of wear of the wear surface increases, the amount of strain experienced by the component may increase (e.g., the amount of strain experienced by the portion of the component may increase). The amount of strain may be caused by one or more components of the machine. For example, the amount of strain may be caused by one or more components of an undercarriage that may be supported by the component. As the amount of strain increases, values of the strain data may increase accordingly. Additionally, values of the strain data may increase when the component is damaged.

In some examples, the component controller may determine an amount of wear, of the component, based on the strain data. The component controller may generate wear information indicating the amount of wear and cause the wireless communication device to transmit the wear information. For example, the wear information may be provided to a machine controller of the machine, to a back office system that is configured to monitor the component, among other examples.

The term "machine" may refer to a device that performs an operation associated with an industry such as, for example, mining, construction, farming, transportation, or another industry. Moreover, one or more implements may be connected to the machine. As an example, a machine may include a construction vehicle, a work vehicle, or a similar vehicle associated with the industries described above.

Figure 1:
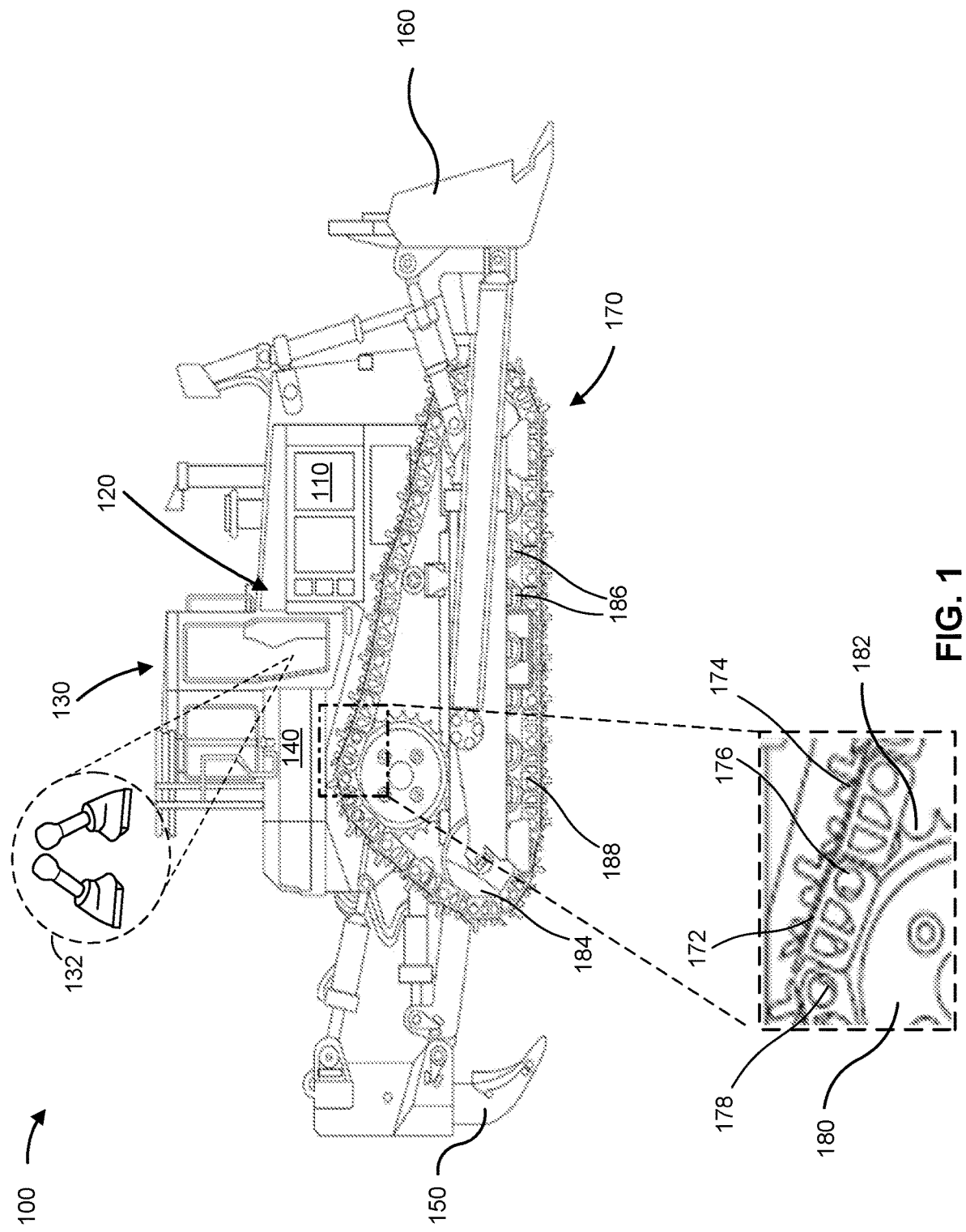
FIG. 1 is a diagram of an example machine described herein.

FIG. 1 is a diagram of an example machine 100 described herein. As shown in FIG. 1, machine 100 is embodied as an earth moving machine, such as a dozer. Alternatively, machine 100 may be another type of track-type machine such as an excavator.

As shown in FIG. 1, machine 100 includes an engine 110, a sensor system 120, an operator cabin 130, operator controls 132, a machine controller 140, a rear attachment 150, a front attachment 160, ground engaging members 170, sprocket 180, one or more idlers 184, one or more rollers 186, and sensing assemblies 188 (referred to herein individually as "sensing assembly 188," and collectively as "sensing assemblies 188").

Engine 110 may include an internal combustion engine, such as a compression ignition engine, a spark ignition engine, a laser ignition engine, a plasma ignition engine, and/or the like. Engine 110 provides power to machine 100 and/or a set of loads (e.g., components that absorb power and/or use power to operate) associated with machine 100. For example, engine 110 may provide power to one or more control systems (e.g., machine controller 140), sensor system 120, operator cabin 130, and/or ground engaging members 170.

Engine 110 can provide power to an implement of machine 100, such as an implement used in mining, construction, farming, transportation, or any other industry. For example, engine 110 may power components (e.g., one or more hydraulic pumps, one or more actuators, and/or one or more electric motors) to facilitate control of rear attachment 150 and/or front attachment 160 of machine 100.

Sensor system 120 may include sensor devices that are capable of generating signals regarding an operation of machine 100. The sensor devices, of sensor system 120, may include a vibration sensor device, a speed sensor device, a motion sensor device, among other examples. As an example, the sensor devices may include one or more inertial measurement units (IMUs).

Operator cabin 130 includes an integrated display (not shown) and operator controls 132. Operator controls 132 may include one or more input components (e.g., integrated joysticks, push-buttons, control levers, and/or steering wheels) to control an operation of machine 100. For example, operator controls 132 may be used to control an operation of one or more implements of machine 100 (e.g., rear attachment 150 and/or front attachment 160) and/or control an operation of ground engaging members 170.

For an autonomous machine, operator controls 132 may not be designed for use by an operator and, rather, may be designed to operate independently from an operator. In this case, for example, operator controls 132 may include one or more input components that provide an input signal for use by another component without any operator input.

Machine controller 140 (e.g., an electronic control module (ECM)) may control and/or monitor operations of machine 100. For example, machine controller 140 may control and/or monitor the operations of machine 100 based on signals from operator controls 132, from sensor system 120, and/or from sensing assemblies 188. Machine controller 140 may determine an amount of wear of one or more components of machine 100 based on the signals from sensor system 120, from operator controls 132, and/or from sensing assemblies 188, as described in more detail below.

Rear attachment 150 may include a ripper assembly, a winch assembly, and/or a drawbar assembly. Front attachment 160 may include a blade assembly. Ground engaging members 170 may be configured to propel machine 100. Ground engaging members 170 may include wheels, tracks, rollers, and/or similar components, for propelling machine 100. Ground engaging members 170 may include an undercarriage that includes tracks (as shown in FIG. 1). The tracks may include track links. In some situations, track link may include a track link bushing and a track link pin. As an example, the tracks may include a first track link 172 and a second track link 174. First track link 172 includes a first track link bushing 176 and a first track link pin 178.

Sprocket 180 may include one or more sprocket segments 182 (referred to herein individually as "sprocket segment 182," and collectively as "sprocket segments 182"). Sprocket 180 may be configured to engage with ground engaging members 170 and to drive ground engaging members 170. For example, sprocket segments 182 may be configured to engage track link bushings (e.g., of the tracks of ground engaging members 170) and rotate to cause the tracks to propel machine 100. Sprocket 180 may be included in a drivetrain of machine 100.

Sensing assembly 188 may be configured to be associated with a component of machine 100. In some examples, sensing assembly 188 may include one or more devices that are configured to sense an amount of wear of the component and provide wear information indicating the amount of wear of the component. Sensing assembly 188 may include a strain measurement device configured to generate strain data that is used to determine the amount of wear of the component, as described in more detail below.

In some examples, the wear information may include information identifying sensing assembly 188, information identifying the component, information identifying a timestamp associated with the wear information, among other examples. The information identifying sensing assembly 188 may include information identifying a manufacturer of sensing assembly 188, information identifying a model of sensing assembly 188, information identifying a serial number of sensing assembly 188, among other examples.

The information identifying the component may include information identifying a manufacturer of the component, information identifying a model of the component, information identifying a part number of the component, information identifying a serial number of the component, information identifying a date and/or a time when the component was installed on machine 100, among other examples.

Sensing assembly 188 may be configured to provide the wear information periodically (e.g., every 3 hours, every shift, every day, among other examples). Additionally, or alternatively, sensing assembly 188 may be configured to provide the wear information based on a trigger (e.g., based on receiving a request from machine controller 140).

As indicated above, FIG. 1 is provided as an example. Other examples may differ from what was described in connection with FIG. 1.

Figure 2:
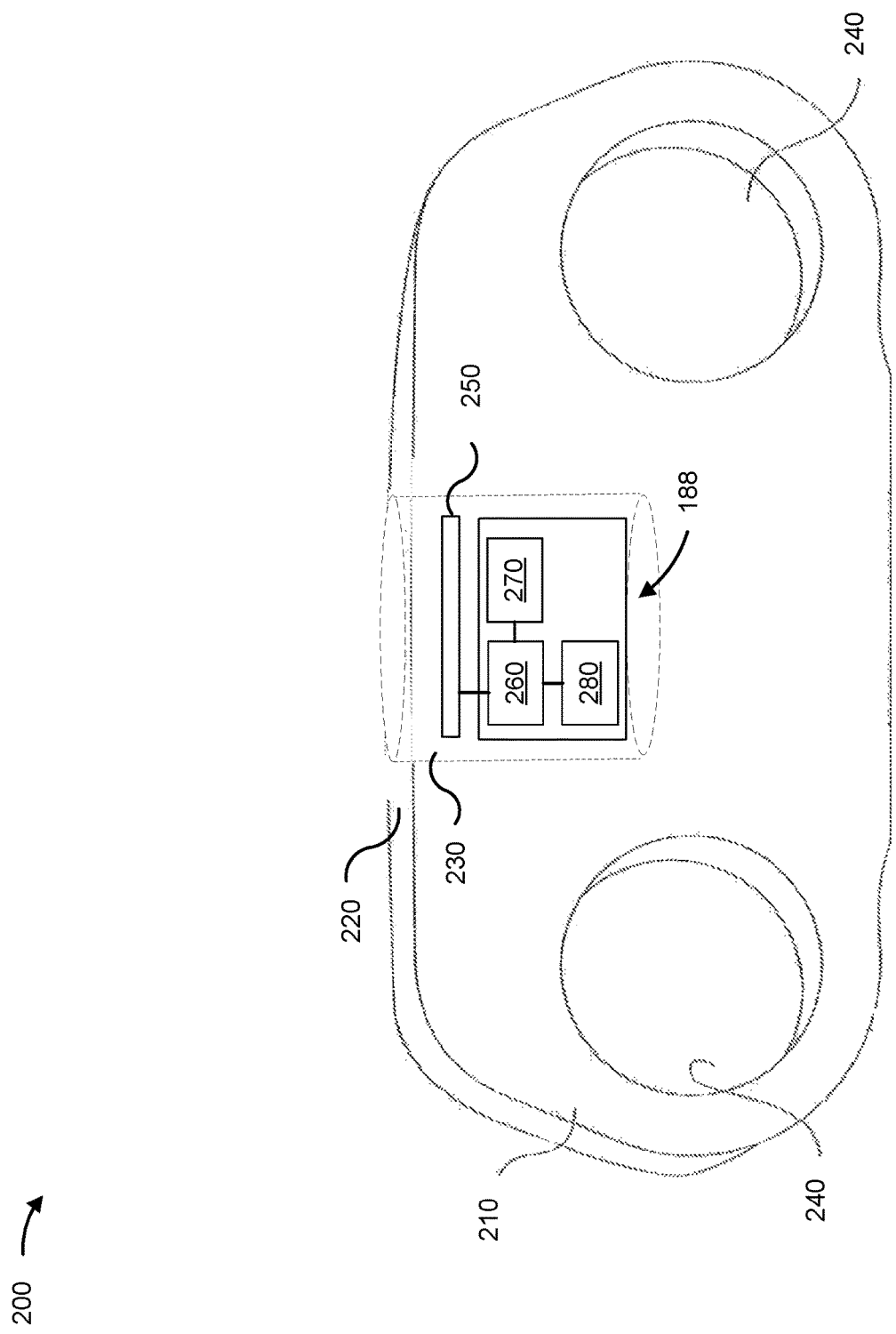
FIG. 2 is a diagram of an example component of the example machine described herein.

FIG. 2 is a diagram of an example component 200 of machine 100 described herein. In some examples, component 200 may be a component of the undercarriage of machine 100, such as first track link 172 or second track link

174. As shown in FIG. 2, component 200 may include a body 210. Body 210 may comprise a metal. The metal may include steel, aluminum, among other examples. Additionally, or alternatively, body 210 may comprise a rubber material.

As shown in FIG. 2, body 210 may include a wear surface 220, a cavity 230, and track through holes 240 configured to received track link pins. Wear surface 220 may include any surface of body 210 in which material wears away during use of the undercarriage. For example, wear surface 220 may be a surface in which material is worn away through contact with other components of the undercarriage and/or with external materials (e.g., a ground surface).

Cavity 230 may be configured to receive sensing assembly 188. While FIG. 2 illustrates that cavity 230 has received a single sensing assembly 188, in some other examples, cavity 230 may receive additional or fewer sensing assemblies 188. Sensing assembly 188 may be retained in cavity 230 using a metal, a rubber material, among other examples of materials that are configured to retain an object in a cavity.

As shown in FIG. 2, sensing assembly 188 may include a strain measurement device 250, a component controller 260, a wireless communication device 270, and a power source 280. In some situations, strain measurement device 250, component controller 260, wireless communication device 270, and/or power source 280 may provided on a printed circuit board.

Strain measurement device 250 may include one or more devices configured to sense an amount of strain experienced by component 200 (e.g., experienced by a portion of component 200) and generate strain data indicating an amount of strain experienced by component 200 (e.g., the portion of component 200). For example, strain measurement device 250 may include a strain gauge. As shown in FIG. 2, strain measurement device 250 may be provided adjacent to wear surface 220. The portion of component 200 may be associated with wear surface 220. In this regard, as an amount of wear of wear surface 220 increases, the amount of strain experienced by component 200 may increase (e.g., the amount of strain experienced by the portion of component 200 may increase).

The amount of strain may be caused by one or more components of machine 100. For example, the amount of strain may be caused by one or more components of the undercarriage that may be supported by component 200. For instance, the amount of strain may be caused by one or more rollers 186. As the amount of strain increases, values of the strain data may increase accordingly. Additionally, values of the strain data may increase when component 200 is damaged.

Component controller 260 (e.g., an electronic control module (ECM)) may control and/or monitor operations of sensing assembly 188. For example, component controller 260 may control and/or monitor the operations of sensing assembly 188 based on signals from strain measurement device 250. For instance, component controller 260 may determine the amount of wear of component 200 based on the strain data. As an example, component controller 260 may determine a first amount of wear of component 200 based on a first value of the strain data, determine a second amount of wear of component 200 based on a second value of the strain data, and so on. The second amount of wear may exceed the first amount of wear based on the second value exceeding the first value.

Component controller 260 may generate the wear information indicating the amount of wear of component 200 and cause wireless communication device 270 to transmit the wear information. In some examples, component controller 260 may include a memory and a processor. The memory includes a random-access memory (RAM), a read only memory (ROM), and/or another type of dynamic or static storage device (e.g., a flash memory, a magnetic memory, and/or an optical memory) that stores information and/or instructions for use by the processor to perform a function.

The processor includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor is implemented in hardware, firmware, and/or a combination of hardware and software. The processor may be capable of being programmed to perform a function, such as generating the wear information and causing wireless communication device 270 to transmit the wear information.

Wireless communication device 270 may include one or more devices that are capable of communicating with component controller 260, machine controller 140, a back office system, among other examples. For example, wireless communication device 270 may be configured to provide the wear information to component controller 260, machine controller 140, the back office system, among other examples. In some situations, wireless communication device 270 may include a transceiver, a separate transmitter and receiver, an antenna, among other examples. Wireless communication device 270 may communicate with the one or more machines using a short-range wireless communication protocol such as, for example, BLUETOOTH® Low-Energy, BLUETOOTH®, Wi-Fi, near-field communication (NFC), Z-Wave, ZigBee, or Institute of Electrical and Electronics Engineers (IEEE) 802.154, among other examples.

Power source 280 may include one or more devices configured to provide power to one or more components of sensing assembly 188. For example, power source 280 may include a battery, a motion-based energy source, among other examples.

While the foregoing example has been described with respect to a component of the undercarriage of machine 100, the present disclosure is applicable to other components of machine 100, such as a tip, an adapter, a base edge, a cutting edge, a shroud, a half arrow, among other components of machine 100 that are subject to wear.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example component may perform one or more functions described as being performed by another set of devices of the example component.

Figure 3:
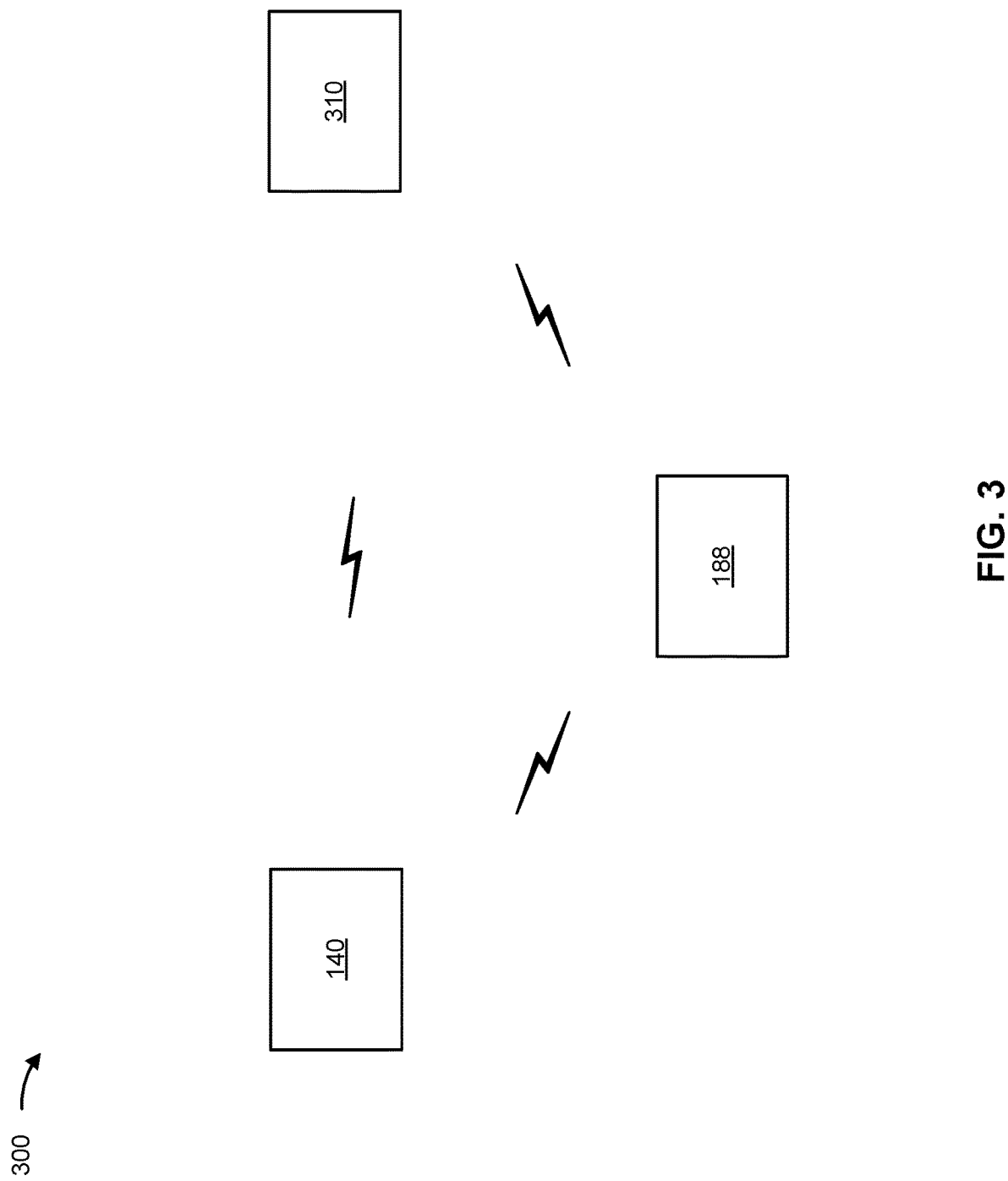
FIG. 3 is a diagram of an example system described herein.

FIG. 3 is a diagram of an example system 300 described herein. As shown in FIG. 3, system 300 includes machine controller 140, sensing assembly 188, and a back office system 310. Machine controller 140 may include a memory and a processor, as described above in connection with component controller 260.

Machine controller 140 may be configured to cause one or more actions to be performed based on wear information for a component of machine 100. The one or more actions are described in more detail below. In some examples, sensing assembly 188 may provide the wear information to cause machine controller 140 to cause the one or more actions to be performed. Sensing assembly 188 may provide the wear information periodically (e.g., every 3 hours, every shift, every day, among other examples). Additionally, or alternatively, sensing assembly 188 may provide the wear information based on a trigger (e.g., based on a request from machine controller 140, based on a request from back office system 310, among other examples).

In some implementations, machine controller 140 may determine the wear information in a manner similar to the manner described above in connection with component controller 260 determining wear information. For example, machine controller 140 may receive (from sensing assembly 188) strain data and determine the wear information based on the strain data.

Machine controller 140 may compare the amount of wear of the component (identified by the wear information) and a wear threshold. Information identifying the wear threshold may be stored in one or more memories associated with machine controller 140. In some situations, the wear threshold may be determined based on historical data regarding an amount of wear of one or more components at a time when the one or more components were replaced. The one or more components may be similar to the component with which sensing assembly 188 is included.

In a case where the amount of wear of the component does not satisfy the wear threshold, machine controller 140 may cause a notification to be provided. The notification may include information identifying the component, information identifying the amount of wear of the component, and/or information identifying one or more components that are associated with and/or that are dependent on the component, among other examples.

The notification may be provided internally with respect to operator cabin 130, provided externally with respect to operator cabin 130, provided to a device of an operator of machine 100, and/or provided to back office system 310, among other examples.

In a case where the amount of wear of the component does satisfy the wear threshold, machine controller 140 may cause one or more actions to be performed in addition to or alternatively to causing the notification to be provided. In this situation, the notification may further indicate that the component is to be replaced and/or repaired. With respect to the one or more actions, machine controller 140 may cause an adjustment of an operation of machine 100 to reduce and/or prevent additional wear of the component. For instance, machine controller 140 may reduce a speed of machine 100, may reduce the speed to bring machine 100 to a stop, and/or may immobilize machine 100, among other examples.

Additionally, or alternatively, to causing the adjustment of the operation of machine 100, machine controller 140 may provide an instruction to the operator to adjust the operation of the machine in a manner similar to the manner described above. Additionally, or alternatively, machine controller 140 may provide a service request to repair the component and/or to replace the component.

Additionally, or alternatively, machine controller 140 may cause machine 100 to autonomously navigate to a repair facility. Additionally, or alternatively, machine controller 140 may cause a calendar, of a technician, to be populated with a calendar event to inspect, repair, and/or replace the component. Additionally, or alternatively, machine controller 140 may cause an alarm to be activated. The alarm may indicate that the one or more components are to be repaired or replaced.

Additionally, or alternatively, machine controller 140 may provide a replacement request to a first autonomous device to cause the first autonomous device to deliver a replacement component to a location associated with machine 100. The location may include a current location of machine 100, a location of a work site where machine 100 performs multiple tasks, a location where machine 100 is stationed when machine 100 is not performing a task, and/or a location where machine 100 is stationed when machine 100 is undergoing repair and/or replacement. The replacement request may include information identifying the location associated with machine 100.

Additionally, or alternatively, to causing the first autonomous device to deliver the replacement component, machine controller 140 may provide a verification request to a second autonomous device to cause the second autonomous device to navigate to the location associated with machine 100 to verify the amount of wear of the component. The verification request may include information identifying the location associated with machine 100. The second autonomous device may generate verification information, based on verifying the component wear information, and may transmit the verification information to machine controller 140.

In some situations, the wear information may enable machine controller 140 to track the component. For example, based on the wear information, machine controller 140 may determine when the component was installed on the machine and/or when the component has been replaced on the machine.

Back office system 310 may include one or more devices that are configured to monitor components of machine 100. Back office system 310 may be remote with respect to machine 100. In some implementations, back office system 310 may perform actions similar to the actions described above in connection with machine controller 140. For example, back office system 310 may receive the wear information from machine controller 140 and/or from sensing assembly 188. Alternatively, back office system 310 may determine the wear information in a manner similar to the manner described above in connection with machine controller 140 determining the wear information. Based on the wear information, back office system 310 may perform actions similar to the actions described above in connection with machine controller 140.

The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of system 300 may perform one or more functions described as being performed by another set of devices of system 300.

INDUSTRIAL APPLICABILITY

Implementations described herein resolve issues associated with inaccurate manual measurements and incorrect predictions regarding an amount wear of a component of a machine. The wear information, determined based on strain data, may be more accurate than manual measurements and information regarding estimated useful life of the component. As a result of the improved accuracy, the component may be repaired or replaced when a repair or a replacement of the component is needed (as opposed to the component being repaired or replaced prematurely).

Additionally, as a result of the improved accuracy, implementations herein may help to reduce a possibility of failure of the component prior to repair and/or replacement of the component. Additionally, as a result of the improved accuracy, the devices may preserve computing or machine resources that would have otherwise been used to remedy issues associated with inaccurate predictions of the amount of wear of the component (e.g., premature failure of the component, premature repair of the component, and/or premature replacement of the component).

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A machine, the machine comprising:
   a track link including:
      a body comprising a cavity;
      a strain measurement device located in the cavity and configured to generate strain data indicating an amount of strain experienced by a portion of the track link;
      a wireless communication device; and
      a component controller configured to:
         determine an amount of wear, of the portion of the track link, based on the strain data;
         generate wear information indicating the amount of wear; and
         cause the wireless communication device to transmit the wear information; and
      a machine controller configured to:
         compare the amount of wear to a wear threshold that is based on historical data regarding an amount of wear of one or more other components at a time when the one or more other components were replaced, and
         cause an adjustment of an operation of the machine based on the amount of wear satisfying the wear threshold.

2. The machine of claim 1, wherein the body comprises a wear surface,
   wherein the strain measurement device is provided adjacent to the wear surface, and
   wherein the amount of strain, experienced by the portion of the track link, increases as the amount of wear increases.

3. The machine of claim 1, wherein the machine controller is further configured to:
   provide a service request to at least one of repair or replace the track link.

4. The machine of claim 1, wherein the component controller, to cause the wireless communication device to provide the wear information, is configured to:
   cause the wireless communication device to provide the wear information to a device that is configured to monitor the track link.

5. The machine of claim 4, wherein the component controller, to cause the wireless communication device to provide the wear information to the device, is configured to:
   cause the wireless communication device to provide the wear information to the device to cause the device to at least one of:
      provide a service request to at least one of repair or replace the track link; or
      provide an instruction, to the machine, to adjust the operation of the machine to prevent additional wear of the track link.

6. A system, comprising:
   a device associated with a machine; and
   a sensing assembly located in a cavity of a component of the machine,
      wherein the sensing assembly comprises:
         a strain measurement device configured to generate strain data indicating an amount of strain experienced by a portion of the component, and
         a component controller configured to:
            generate, based on the strain data, wear information indicating an amount of wear of the portion of the component; and
            cause the wear information to be provided to the device to cause an adjustment of an operation of the machine, and
      wherein the device is configured to:
         compare the amount of wear, of the portion of the component, to a wear threshold that is based on historical data regarding an amount of wear of one or more other components at a time when the one or more other components were replaced, and
         cause the adjustment of the operation of the machine based on the amount of wear associated with the component satisfying the wear threshold.

7. The system of claim 6, wherein the component is a component of an undercarriage of the machine.

8. The system of claim 6, wherein the component comprises a wear surface,
   wherein the strain measurement device is provided adjacent to the wear surface, and wherein the amount of strain, experienced by the portion of the component, increases as an amount of wear of the wear surface increases.

9. The system of claim 6,
wherein the sensing assembly further comprises a wireless communication device, and
wherein the component controller, to cause the wear information to be provided to the device, is configured to:
cause the wireless communication device to provide the wear information to the device.

10. The system of claim 9, wherein the component controller, to cause the wireless communication device to provide the wear information, is configured to:
cause the wireless communication device to provide the wear information to the device to cause the device to at least one of:
provide an instruction to adjust the operation of the machine; or
provide a service request to at least one of repair or replace the component.

11. The system of claim 6, wherein the component controller, to cause the wear information to be provided to the device, is configured to:
cause the wear information to be provided to a machine controller of the machine to cause the adjustment of the operation of the machine.

12. The system of claim 6, wherein the component is a track link of an undercarriage of the machine.

13. A system, the system comprising:
one or more devices; and
a component comprising:
a body comprising a cavity; and
a sensing assembly located in the cavity,
wherein the sensing assembly comprises:
a strain measurement device configured to generate strain data indicating an amount of strain experienced by a portion of the component; and
a component controller configured to:
generate, based on the strain data, wear information indicating an amount of wear of the portion of the component; and
cause the wear information to be provided to the one or more devices, and
wherein the one or more devices are configured to:
compare the amount of wear, of the portion of the component, to a wear threshold that is based on historical data regarding an amount of wear of one or more other components at a time when the one or more other components were replaced, and
cause an adjustment of an operation based on the amount of wear associated with the component satisfying the wear threshold.

14. The system of claim 13, wherein the sensing assembly further comprises:
a wireless communication device, and
wherein the component controller, to cause the wear information to be provided, is configured to:
cause the wireless communication device to provide the wear information to the one or more devices.

15. The system of claim 14, wherein one or more devices are further configured to:
provide a service request to at least one of repair or replace the component.

16. The system of claim 13, wherein the component is a track link of an undercarriage of a machine.

17. The system of claim 13, wherein the body comprises a wear surface, and
wherein the strain measurement device is provided adjacent to the wear.

18. The system of claim 13, wherein the adjustment of the operation is an adjustment that prevents additional wear of the component.

19. The system of claim 13,
wherein the component is a track link,
wherein the track link includes the cavity and track through holes configured to receive track link pins,
wherein the sensing assembly further comprises a wireless communication device and a power source located in the cavity, and
wherein the power source includes a battery or a motion-based energy source.

20. The system of claim 13, wherein the one or more devices include:
a machine controller of a machine associated with the component, or
a back office system that is remote with respect to the machine.

* * * * *